United States Patent Office 3,108,111
Patented Oct. 22, 1963

3,108,111
1-OXYALKYL-4-HYDROXYALKYL-4-PHENYL PIPERIDINES
Edward Severin Stern, Robert Lawson Watt, and Denis Geoffrey Hardy, all of Edinburgh, Scotland, assignors to J. F. MacFarlan & Company Limited, Boreham Wood, England, a British company
No Drawing. Filed July 1, 1959, Ser. No. 824,181
Claims priority, application Great Britain July 14, 1958
5 Claims. (Cl. 260—294.7)

This invention relates to novel piperidine compounds and their production.

The compounds of the present invention are of the general formula:

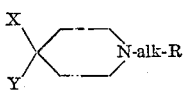

where:
X is a phenyl group,
Y is a hydroxymethyl ($CH_2OH$), hydroxyethyl, or hydroxypropyl group,
alk is an alkylene group (straight or branch-chain) containing up to six carbon atoms, and
R is:
 (a) an alkoxy group containing up to six carbon atoms, or
 (b) an aryloxy group, or
 (c) an aralkoxy group, or
 (d) a group containing a heterocyclic oxygen atom, or
 (e) an aryl group, or
 (f) a heterocyclic residue carrying a basic nitrogen atom (e.g. pyridine, piperidine, morpholine, piperazine), or
 (g) an alkoxy group carrying a further oxygenated substituent such as a hydroxy, ethoxy or phenoxy group.

The substances of the present invention are new; they have valuable properties, in particular cough-suppressant potency without pethidine-like analgesic properties. The analgesic action exhibited by some of the substances is mild and the substances are non-addictive.

The intermediates 4-hydroxymethyl-4-phenylpiperidine and 4-1'-hydroxypropyl-4-phenylpiperidine hereinafter described are also new substances.

The present invention also includes processes for the preparation of the novel compounds of the present invention. Thus, the compounds may be prepared by reduction (catalytic or chemical) of compounds of the general formula:

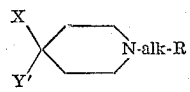

where X, alk and R are as defined above and Y' is either a carbomethoxy, carbethoxy or propoxycarbonyl group, or an acetyl or propionyl group. Thus, the primary alcohol group may be introduced into the otherwise preformed molecule and it may subsequently be alkylated or acylated as desired. Alternatively, the secondary base

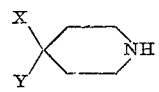

where X and Y are as defined above may be alkylated with a halide R—alk—Cl, R—alk—Br, or R—alk—I, where R and alk are as defined above.

The following examples, in which parts are by weight, illustrate the invention:

EXAMPLE 1

*4-Hydroxymethyl-4-Phenyl-1-Tetrahydrofurfuryloxyethylpiperidine*

Ethyl 4-phenyl-1-tetrahydrofurfuryloxyethylpiperidine-4-carboxylate (8 parts) was dissolved in dry ether (120 parts) and added to lithium aluminium hydride (1 part) in dry ether (120 parts). The resulting suspension was boiled for 10 minutes and then cooled and treated with a 20% aqueous solution (75 parts) of Rochelle salt. After ether extraction and evaporation of the ether the oily residue was distilled. It had B.P. 160° C./0.05 mm. and crystallised on standing. Its refractive index, $n_D^{20}$, was 1.5303.

EXAMPLE 2

*4-1'-Hydroxypropyl-4-Phenyl-1-Tetrahydrofurfurylpiperidine*

4-1'-hydroxypropyl-4-phenylpiperidine (20 parts), B.P. 130–135° C./0.5 mm., obtained from 4-phenyl-4-propionylpiperidine, B.P. 135° C./0.4 mm., $n_D^{20}$ 1.5467 by hydrogenation over Adam's catalyst in ethanol, was dissolved in pentyl alcohol (250 parts). Sodium carbonate (5 parts) and tetrahydrofurfuryl chloride (20 parts) B.P. 42° C./1 mm., $n_D^{20}$ 1.4553 were added and the mixture was refluxed for 48 hours. After filtration, fractional distillation of the filtrate gave the desired 4-1'-hydroxypropyl-4-phenyl-1-tetrahydrofurfuryl-piperidine, B.P. 170° C./0.05 mm., $n_D^{20}$ 1.5375.

EXAMPLE 3

*4-Hydroxymethyl-4-Phenyl-1-4'-Ethoxybutylpiperidine*

Ethyl 4-phenyl-1-4'-ethoxybutylpiperidine-4-carboxylate (10 parts) was dissolved in dry ether and added to a 1% ethereal solution (125 parts) of lithium aluminium hydride. After boiling for 10 minutes the solution was decomposed with dilute aqueous hydrochloric acid and ether extracted. Distillation of the dried organic phase gave 4-hydroxymethyl-4-phenyl-1-4'-ethoxybutyl-piperidine, B.P. 155° C./0.4 mm., $n_D^{20}$ 1.5180.

EXAMPLE 4

*4-Hydroxymethyl-4-Phenyl-1-2'-Ethoxyethylpiperidine*

Ethyl 4-phenyl-1-2'-ethoxyethylpiperidine-4-carboxylate (10 parts) was dissolved in alcohol (35 parts) and sodium (5 parts) was added. When the vigorous reaction had subsided more sodium (5 parts) was added and the solution was boiled for 30 minutes. The solution was then cooled, diluted with ten volumes of water, and exhaustively extracted with ether. Distillation of the dried ethereal extracts gave 4-hydroxymethyl-4-phenyl-1-2'-ethoxyethylpiperidine, B.P. 146–150° C., $n_D^{20}$ 1.5240, which solidified on keeping and on crystallisation from ethyl acetate-light petroleum mixture had M.P. 103–104° C.

EXAMPLE 5

*4-1'-Hydroxypropyl-4-Phenyl-1-2'-Phenoxyethylpiperidine*

Ethyl 4-phenyl-4-propionyl-1-2'-phenoxyethylpiperidine was hydrogenated in ethanol over Adam's catalyst. After absorption of 1 equivalent of hydrogen, the reaction ceased and the reaction mixture was filtered. Evaporation of the alcohol and addition of concentrated aqueous hydrobromic acid gave 4-1'-hydroxypropyl-4-phenyl-1-2'-phenoxyethylpiperidine in form of its crystalline hydrobromide, M.P. 178° C.

EXAMPLE 6

*4-Hydroxymethyl-1-Phenethyl-4-Phenylpiperidine*

Reduction of ethyl 4-phenylpiperidine-4-carboxylate (20 parts) with lithium aluminium hydride (1.5 parts) in ether afforded 4-hydroxymethyl-4-phenylpiperidine (15 parts), M.P. 80° C. This secondary base (10 parts) was treated with phenethyl chloride (10 parts) and sodium carbonate (2 parts) in boiling amyl alcohol for 48 hours. Filtration and evaporation then gave 4-hydroxymethyl-1-phenethyl-4-phenylpiperidine which crystallised on keeping and had M.P. 108° C.

EXAMPLE 7

*4-Hydroxymethyl-4-Phenyl-1-Tetrahydrofurfuryl-piperidine*

Ethyl 4-phenyl-1-tetrahydrofurfurylpiperidine - 4 - carboxylate (10 parts) was dissolved in ether and added slowly to a 1% ethereal solution (125 parts) of lithium aluminium hydride. The suspension was stirred and boiled for 10 minutes, and then treated with aqueous Rochelle salt. Exhaustive ether extraction and distillation gave 4-hydroxymethyl-4-phenyl - 1 - tetrahydrofurfurylpiperidine, B.P. 180° C./0.3 mm., $n_D^{20}$ 1.5480, which solidified on keeping and had M.P. 78–80° C.

EXAMPLE 8

*4-Hydroxymethyl-4-Phenyl-1-2'-Morpholionethyl-piperidine*

Ethyl 4-phenyl-1-2'-morpholinoethylpiperidine - 4 - carboxylate was reduced by the method of Example 7. The base, 4-hydroxymethyl-4-phenyl - 1 - 2' - morpholinoethylpiperidine, obtained had M.P. 130° C.

EXAMPLE 9

*4-Hydroxymethyl-4-Phenyl-1-2'-Piperidinoethylpiperidine*

Reduction, by the method detailed in Example 7, of ethyl 4-phenyl-1-2'-piperidinoethylpiperidine-4-carboxylate gave 4-hydroxymethyl-4-phenyl-1-2'-piperidinoethylpiperidine, M.P. 106° C.

EXAMPLE 10

*4-Hydroxymethyl-1-2'-2''-Phenoxyethoxyethyl-4-Phenylpiperidine*

Reduction, by the method detailed in Example 7, of ethyl-1-2'-2''-phenoxyethoxyethyl - 4 - phenylpiperidine-4-carboxylate gave 4-hydroxymethyl-1-2'-2''-phenoxyethoxyethyl-4-phenylpiperidine, M.P. 78° C.

EXAMPLE 11

*1-2'-Benzyloxyethyl-4-Hydroxymethyl-4-Phenylpiperidine*

Reduction, by the method detailed in Example 7, of ethyl 1-2'-benzyloxyethyl-4-phenylpiperidine-4-carboxylate gave 1-2'-benzyloxyethyl-4-hydroxymethyl-4-phenylpiperidine, M.P. 82–84° C.

EXAMPLE 12

*1-2'-2''-Hydroxyethoxyethyl-4-Hydroxymethyl-4-Phenylpiperidine*

4-hydroxymethyl-4-phenylpiperidine (10 parts) described in Example 6, was refluxed in amyl alcohol (100 parts) for 48 hours with 2-chloroethyl-2'-hydroxyethyl ether (5 parts) over sodium carbonate (4 parts). The mixture was allowed to cool and then filtered. The filtrate on distillation gave 1-2'-2''-hydroxyethoxyethyl-4-hydroxymethyl-4-phenylpiperidine, B.P. 180–190° C./0.2 mm.

What we claim is:

1. A compound selected from the group consisting of 4-hydroxymethyl-4-phenyl-1 - tetrahydrofurfuryloxyethylpiperidine, 4-hydroxymethyl - 4 - phenyl-1-4'-ethoxybutylpiperidine, 4-hydroxymethyl - 4 - phenyl-1-2'-ethoxyethylpiperidine and 4-1'-hydroxypropyl-4-phenyl-1-2'-phenoxyethylpiperidine.

2. 4-hydroxymethyl-4-phenyl-1 - tetrahydrofurfuryloxyethylpiperidine.

3. 4-hydroxymethyl - 4 - phenyl-1-4'-ethoxybutylpiperidine.

4. 4-hydroxymethyl - 4 - phenyl-1-2'-ethoxyethylpiperidine.

5. 4-1'-hydroxypropyl-4-phenyl-1-2'-phenoxyethylpiperidine.

References Cited in the file of this patent

UNITED STATES PATENTS

| | | |
|---|---|---|
| 2,784,192 | Schmidle et al. | Mar. 5, 1957 |
| 2,882,274 | Jacob et al. | Apr. 14, 1959 |
| 2,892,842 | McElvain | June 30, 1959 |
| 2,900,384 | Rudner | Aug. 18, 1959 |
| 2,927,111 | Biel | Mar. 1, 1960 |

OTHER REFERENCES

Badger et al.: Journal of the Chemical Society (1949), page 1141.

Elpern: Journal of the American Chemical Society, volume 76, pages 281 and 282 (1954).

Gaylord: Reduction with Complex Metal Hydrides (textbook), Interscience Publishers Inc., New York (1956), pages 391–393, 396 and 397.

Derwent: Belgian Report (Belgium patent abstract), volume 51B, page C 24, Apr. 16, 1959.